Oct. 13, 1970   A. M. HERZIG   3,533,687
EYEGLASSES HAVING OBLIQUELY HINGED BOWS
Filed March 28, 1968   2 Sheets-Sheet 1
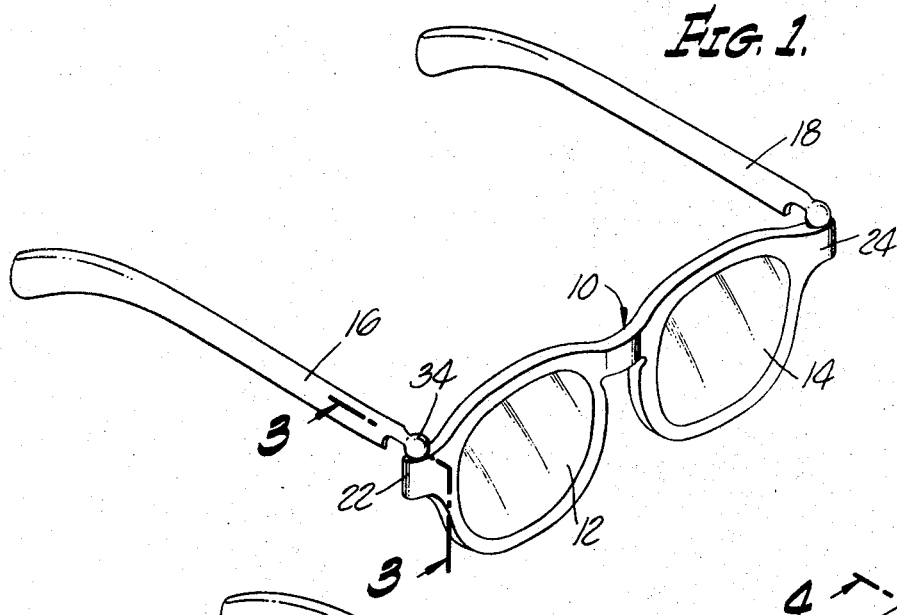
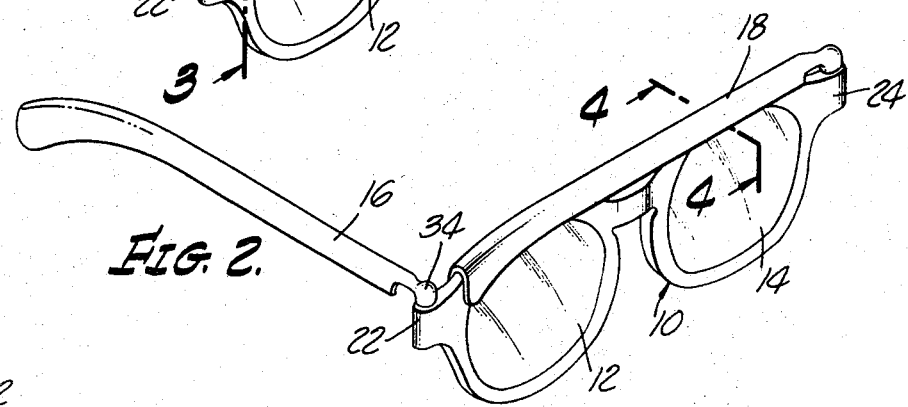
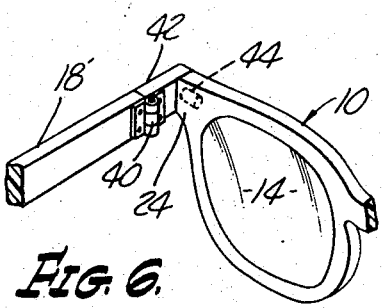
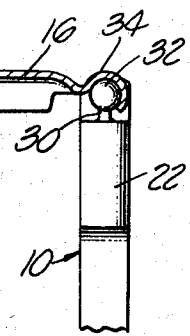
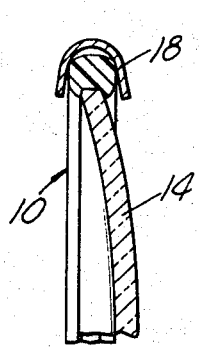
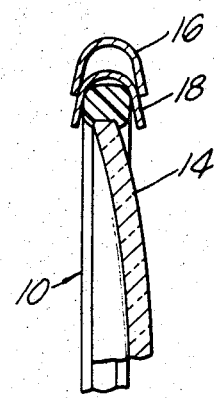
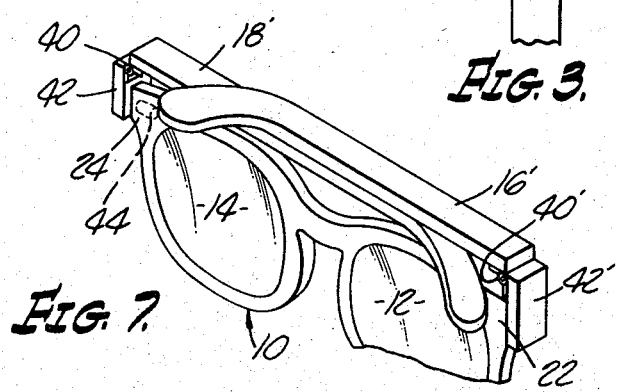
INVENTOR.
ALBERT M. HERZIG
BY
Herzig, Walsh & Blackham
ATTORNEYS

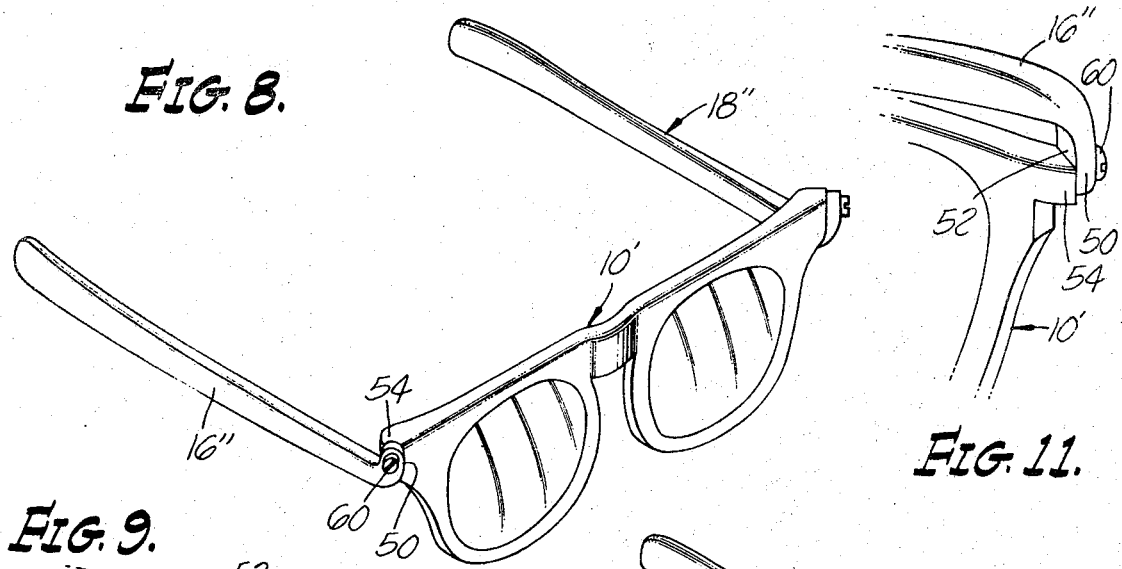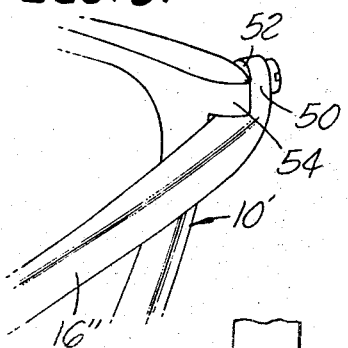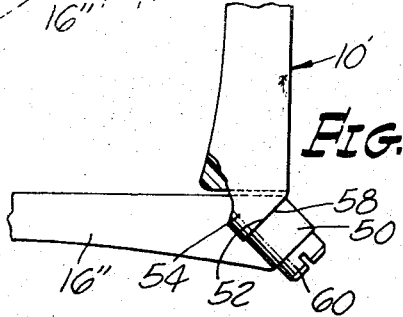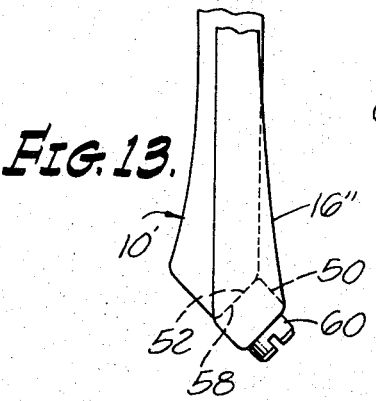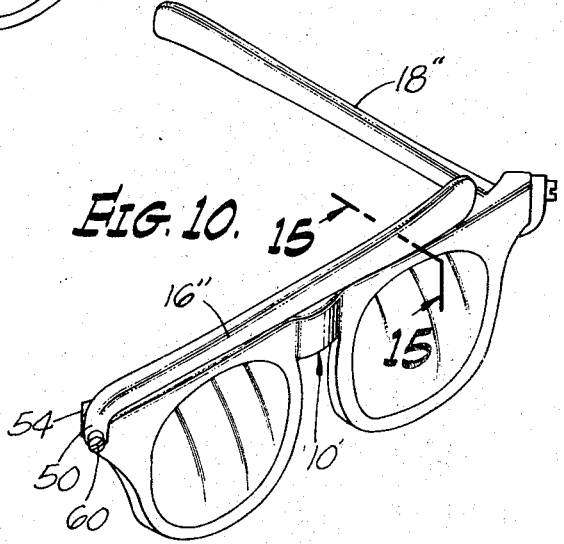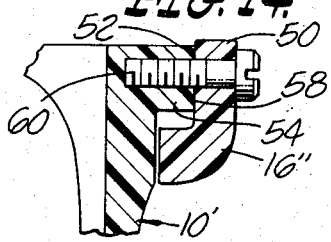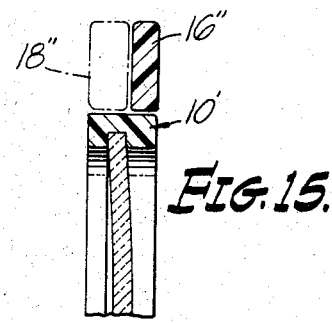

ered by ordinary letters patent.

United States Patent Office 3,533,687
Patented Oct. 13, 1970

3,533,687
EYEGLASSES HAVING OBLIQUELY HINGED BOWS
Albert M. Herzig, 700 N. Rexford Drive,
Beverly Hills, Calif. 90210
Filed Mar. 28, 1968, Ser. No. 716,742
Int. Cl. G02c 5/14
U.S. Cl. 351—121
1 Claim

ABSTRACT OF THE DISCLOSURE

The invention is an improved collapsible eye glass frame with bows. The bows are joined to the frame so that they can be folded inwardly and collapsed into a position overlying the frame. The purpose is to provide for collapsing the frame into a thinner, more compact body or configuration.

The bows are joined to the frame by way of joints allowing the frames to swing both inwardly and upwardly with respect to the frame, to be collapsed downwardly into a position overlying the frame or overlying each other on top of the frame.

SUMMARY OF THE INVENTION

The invention resides in improved frames and bows for eye glasses. The improvement resides in the manner of joining the bows to the frame so that they can be collapsed into a position overlying each other on top of the frame. The object of the invention is to provide means whereby it is possible to collapse eye glasses into a thinner, more compact body or configuration. The realization of this objective is of considerable significance. As frames for eye glasses are conventionally and commonly constructed at the present time, the bows fold inwardly with one partly overlying the other adjacent to but laterally spaced from the upper part of the frame. As is well known, frames for eye glasses at the present time are conventionally constructed with the bows attached to the frames near the upper part or edge thereof. The bows when folded in the conventional manner form a relatively thick article inasmuch as the two bows and the frame overly each other in the thickness dimension. The glasses are conventionally carried in a case made of leather or other material and with the folded glasses in the case, a rather bulky and inconvenient article to be carried results. Typically, the case with the glasses in it is carried in the breast pocket and with frames as heretofore constructed and folded as described, the article becomes a rather bulky and unweildly one particularly when carried in this pocket. The object of this invention is to overcome this drawback and to provide a means of folding the bows into a substantially thinner configuration so that when carried in a case as described, the case is considerably less bulky and does not cause a substantial bulge when carried in a breast pocket. This object of the invention is analogous to that which has been realized to a considerable degree in the provision and offering of thin type wallets which do not occasion bulkiness or bulging when carried in the hip pocket.

In the preferred form of the invention the bows are attached to the frame by means whereby the bows can be folded both inwardly and upwardly so as to collapse into a position overlying each other on top of the frame. Preferably, the bows are configured so that one can telescopingly fit over the top of the other when collapsed.

A further object of the invention is to provide frames and bows as described wherein the bows are attached by way of universal joints in order to accomplish the desired result.

Another object is to provide bows and frames as described wherein each bow is attached by way of a double hinge or pivotal joints.

Another object of the invention is to provide bows and frames as described wherein each bow has only a single pivotal joint or connection to the frame, the axis of the joint being so oriented and the ends of the bows being so configured that when the bows are swung into collapsed position they move upwardly and inwardly into a position overlying the frame. Another object is to provide a structure as set forth herein wherin the bows come into a position laterally adjacent each other over the frame.

Specific preferred means are shown in the drawings and described hereinafter for providing the jointed connection of the bows to the frame.

Further objects and additional advantages of the invention will become apparent from the following detailed description and annexed drawings wherein:

FIG. 1 is a perspective view of a preferred form of the invention;

FIG. 2 is a view like that of FIG. 1 showing the glasses partly folded or collapsed;

FIG. 3 is a partial sectional view taken along the line 3—3 of FIG. 1;

FIG. 4 is a partial sectional view taken along the line 4—4 of FIG. 2;

FIG. 5 is a view similar to that of FIG. 4 with both bows in collapsed position;

FIG. 6 is a partial view of a modified form of the invention;

FIG. 7 is a view like that of FIG. 6 with the bow shown in a collapsed position;

FIG. 8 is a perspective view of another modified form of the invention;

FIG. 9 is a partial view of the form of the invention of FIG. 8;

FIG. 10 is a view of the form of the invention of FIG. 8 with one bow folded;

FIG. 11 is a view like FIG. 9 with the bow partially collapsed;

FIG. 12 is a top view of the structure shown in FIG. 9;

FIG. 13 is a view like FIG. 12 with the bow collapsed;

FIG. 14 is a sectional view showing the joint between one bow and the frame;

FIG. 15 is sectional view taken along line 15—15 of FIG. 10.

Referring to FIGS. 1 to 5 of the drawings, numeral 10 designates a generally conventional frame for eye glasses having lenses 12 and 14 fitting therein. The frame 10 may be of any particular construction, and the invention being particularly adapted to frames of the horn rim or similar type that are more than ordinarily bulky. Attached to the frame 10 are the bows 16 and 18. The bows are attached to the frames in such a way that the bows can be folded inwardly into a position with one overlying the other on top of the top edge of the frame 10 as illustrated in FIGS. 2, 4, and 5.

The frame 10 at the sides of the lenses has extending parts 22 and 24 to which the bows are attached. Referring to the bow 16, preferably it has a cross sectional configuration as may be seen in FIG. 5 so that it can fit down telescopingly over the bow 18 which is similarly configurated. The bows may be made of any suitable material such as plastic or the like.

Referring to the joint between the bow 16 and the frame 10, the part 22 has an upstanding stem 30 which is received in a bore in a ball 32 forming part of a ball and socket joint. A the end of the bow 16 it is configurated to form a socket 34 engaging the ball 32. The joint between the bow 18 and the frame 10 is similar. It will be observed that the bow 16 can be rotated in a horizontal as well as a vertical plane relative to the ball and socket joint formed by the ball 32 and socket 34. The ball 32 is constructed to have limited vertical movement relative to the stem 30. As will be observed with the construction described, the bow 18 can be folded in and telescoped down over the frame 10 as shown in FIG. 2. Then the bow 16 can be folded in and down and telescoped over the top of the bow 18 and the frame 10 as shown in FIG. 5 so that a relatively thin compact configuration is realized. Both the frames and the bows may be fabricated or constructed to be relatively thin in a fore and aft direction with respect to the glasses so that the objective is enhanced of being able to collapse the glasses into a thin compact configuration.

FIGS. 6 and 7 show a slightly modified form of the invention wherein a modified means is provided for attaching the bows to the frame so that the desired collapsibility capability is realized. Bow 18' has in it a hinge 40 forming a joint whereby it can be swung inwardly. The hinge 40 is spaced from the part 24 of the frame 10 to the extent of the end part 42 of the bow 18' which is attached to the part 24 of the frame 10. This attachment is simply by way of a pin 44 extending inwardly from the bow part 42 into a bore in the part 24 of the frame 10. This pin 44 fits in its bore with a desired degree of friction allowing the bow 18' to be rotated in a vertical direction or in a vertical plane. Any desired means of holding or preventing the pin 44 from coming out of the part 24 may be used, it of course being possible that it is simply held therein by friction.

The bow 16' on the other side of the frame is jointed to it by a similar construction which therefor need not be described in detail except that the piece 42' spaces the hinge 40' a different distance from the frame 10 by an amount substantially equal to the lateral thickness of the bows. Thus, the bows 16' and 18, can be swung in a vertical plane and then swung inwardly about their hinges into a position overlying the frame 10 with one bow over the other, the bow which is on top being the one which has its hinge spaced the greater distance from the frame 10. In this manner, a very thin and compact configuration of the glasses when folded or collapsed is realized in a very simple and economical way.

FIGS. 8 to 15 show another form of the invention wherein each bow is attached to the frame by way of only a single joint, hinge, or pivotal connection. Parts that are like similar parts in previous embodiments are identified by the same reference characters primed or double primed.

FIG. 8 shows the bows in this form of the invention extended.

FIG. 10 shows one bow collapsed over the frame. The other figures show the details of construction at the ends of the bows and the pivotal connection to the frame.

Referring to FIGS. 9, 11, 12, 13, 14, and 15 it will be observed that the bow 16" has an upwardly turned offset 50 at the end which has a flat inside face 52 which lies in a plane disposed or oriented at an angle of substantially 45° with respect to the plane of the frames of the glasses. The upper part of the frame 10' adjacent to the lug 50 has an extending lug or projection 54 which is tapered as shown and which present a plane surface 58 also lying in a plane disposed at an angle of substantially 45° to the plane of the frames and parallel to the plane surface 52. The bow 16" in the extended position extends under the lug 54 and the plane surface 52 is brought into juxtaposition with the plane surface 58 on the lug 54. Numeral 60 designates a screw of a conventional type which extends through the lug 50 on the bow 16' and threads into the extending projection 54 on the frame 10' as may be seen in FIG. 14. The pivotal connection, joint or hinge whereby the other frame 18' is attached to the frame 10' is the same and therefore need not be described in detail. FIGS. 10 and 15 show the bow 16" collapsed or folded into a position over the frame 10'. It will be noted that the bow 16" like the bow 18" is relatively narrow laterally and broader in a vertical direction. When folded in as shown in FIG. 10 the narrow lateral dimension remains similarly oriented with respect to the frames, that is, this narrow dimension extends in a fore and aft direction so that when the frames are folded in, the total thickness of the item does not become substantially increased too thereby realize one of the primary objects of the invention.

It will be observed that when the bow 16" is folded or collasped inwardly from the position of FIGS. 8 and 9 to the position of FIG. 10 the bow swings inwardly about the axis of the screw 60 and also inwardly in an arc. When folded inwardly, the lug 50 extends downwardly from the bow 16" so that the bow is now overlying the frame 10' and is in a position as shown in FIG. 10. Thus, the desired movements of the bows are accomplished with only a single joint, hinge, or pivotal connection to the frames. The motions of the two bows being folded inwardly are, of course, similar.

From the foregoing, those skilled in the art will observe and understand the nature of the invention and the manner in which it realizes and achieves the objects and results as set forth in the foregoing, as well as the many additional advantages that are apparent from the detailed description.

The foregoing disclosure is representative of preferred forms of the invention and is to be interpreted in an illustrative rather than a limiting sense, the invention to be accorded the full scope of the claims appended thereto.

What is claimed is:

1. In a pair of eyeglasses, a frame having lenses mounted therein and having an upper generally straight edge; a pair of substantially straight bows pivoted to said frame at respectively opposite ends thereof on substantially horizontal axes at the ends of said upper edge, said axes extending forwardly and obliquely outwardly of said frame whereby said bows may be swung to extend rearwardly from said frames or to overlie said upper edge, each of said bows being provided with a laterally extending end portion, extending upwardly therefrom when said bows extend rearwardly of said frames, said axes extending through said end portions, and cooperating stop means on said bows and frame to limit pivotal movement of said bows about said axes in one direction.

References Cited

UNITED STATES PATENTS

| 2,753,762 | 7/1956 | Dorgelys | 351—111 |

FOREIGN PATENTS

| 345,075 | 3/1931 | Great Britain. |
| 588,539 | 5/1947 | Great Britain. |
| 626,533 | 7/1949 | Great Britain. |
| 801,412 | 5/1936 | France. |
| 847,794 | 7/1939 | France. |
| 1,039,916 | 5/1953 | France. |
| 1,049,163 | 8/1953 | France. |
| 527,807 | 6/1955 | Italy. |

DAVID SCHONBERG, Primary Examiner

J. W. LEONARD, Assistant Examiner

U.S. Cl. X.R.

351—111, 115, 153